(12) United States Patent
Jenkins et al.

(10) Patent No.: US 11,472,361 B2
(45) Date of Patent: Oct. 18, 2022

(54) SYSTEMS AND METHODS FOR DETECTING AN IMPACT EVENT IN A PARKED VEHICLE

(71) Applicant: CalAmp Corp., Irvine, CA (US)

(72) Inventors: Jeff Jenkins, Irvine, CA (US); Peter Hergesheimer, Encinitas, CA (US)

(73) Assignee: CalAmp Corp., Irvine, CA (US)

( * ) Notice: Subject to any disclaimer, the term of this patent is extended or adjusted under 35 U.S.C. 154(b) by 339 days.

(21) Appl. No.: 16/748,162

(22) Filed: Jan. 21, 2020

(65) Prior Publication Data

US 2021/0221312 A1 Jul. 22, 2021

(51) Int. Cl.
  *B60R 21/0132* (2006.01)
  *G01P 1/07* (2006.01)
  *G07C 5/08* (2006.01)
  *B60R 21/017* (2006.01)
  *G06N 20/00* (2019.01)

(52) U.S. Cl.
  CPC ........ *B60R 21/0132* (2013.01); *B60R 21/017* (2013.01); *G01P 1/07* (2013.01); *G07C 5/0808* (2013.01); *G06N 20/00* (2019.01)

(58) Field of Classification Search
  CPC ... B60R 21/0132; B60R 21/017; G01P 1/017; G07C 5/0808; G06N 20/00
  USPC ...................................................... 701/32.2
  See application file for complete search history.

(56) References Cited

U.S. PATENT DOCUMENTS

| 8,682,525 | B1* | 3/2014 | Kalinadhabhotla | .... G07C 5/008 |
| | | | | 701/36 |
| 8,799,034 | B1 | 8/2014 | Brandmaier et al. | |
| 9,393,920 | B2 | 7/2016 | Hosey et al. | |
| 10,399,523 | B1 | 9/2019 | Christensen et al. | |
| 2014/0172190 | A1* | 6/2014 | Kalinadhabhotla | ....... G06F 7/00 |
| | | | | 701/1 |

FOREIGN PATENT DOCUMENTS

EP 3021289 A1 5/2016

OTHER PUBLICATIONS

International Search Report for Application No. PCT/US2020/14388, dated Apr. 14, 2020, 15 pages.

* cited by examiner

*Primary Examiner* — Gertrude Arthur Jeanglaude
(74) *Attorney, Agent, or Firm* — Barnes & Thornburg LLP

(57) ABSTRACT

Embodiments of the invention include a vehicle telematics system including a telematics device, wherein the telematics device detects, using a processor of a telematics device, a vehicle ignition off event and reconfigures at least one parameter of an accelerometer for a low power mode of operation while in the vehicle ignition off state, and places the telematics device in a sleep mode of operation, wherein an accelerometer generates an interrupt to wake the processor of the telematics device from the sleep mode of operation upon detecting an acceleration event that exceeds a threshold, and the processor of the telematics device analyzes the accelerometer data stored in a FIFO buffer of the accelerometer.

20 Claims, 7 Drawing Sheets

SYSTEMS AND METHODS FOR DETECTING AN IMPACT EVENT IN A PARKED VEHICLE

FIELD OF THE INVENTION

The present invention relates to detecting an impact to a parked vehicle with the ignition off, in particular, to configuring an accelerometer to continue monitoring for impact events using minimal power while the vehicle is turned off.

BACKGROUND

Telematics is the integrated use of telecommunications and informatics. Telematics units are installed in vehicles to provide a variety of telematics functionality in the vehicle. This functionality includes, but is not limited to, crash detection, emergency warning systems, navigation functionality, safety warnings, and automated driving assistance. Telematics units are also capable of recording data related to the operation of the vehicle and providing that information for analysis, whether in real-time or during a time when the vehicle is being serviced. This information can be used in a variety of applications, such as crash detection, fleet tracking, shipment tracking, insurance calculations, and in vehicle management and service. Telematics units may use a variety of sensors, including accelerometers, gyroscopes, impact sensors, among others, to detect the occurrence of an impact to a vehicle while it is being driven and to provide a notification to a third party of the occurrence of a crash. These features often use significant power and processing resources and are available while the vehicle is in an operational state.

SUMMARY OF THE INVENTION

Systems and methods for impact determination in accordance with embodiments of the invention are disclosed. In one embodiment, a vehicle telematics device includes a processor and a memory connected to the processor and storing a crash determination application, an accelerometer that generates acceleration data at a normal sample rate during an active operation mode and stores the acceleration data in a first-in-first-out (FIFO) buffer, wherein the processor of the telematics device, on reading the crash determination application, is directed to: detect a vehicle ignition off event, reconfigure at least one parameter of the accelerometer for a low power mode of operation while in the vehicle ignition off state, and place the telematics device in a sleep mode of operation, wherein the accelerometer of the telematics device while operating in the low power mode of operation is directed to: generate an interrupt to wake the processor of the telematics device from the sleep mode of operation upon detecting an acceleration event exceeding a threshold, wherein the telematics device, on receiving the interrupt from the accelerometer, is directed to: wake the processor in order to analyze accelerometer data stored in the FIFO buffer of the accelerometer.

In an additional embodiment of the invention, the at least one parameter of the accelerometer is at least one parameter selected from the group consisting of a sample rate and a word size of the accelerometer.

In yet another additional embodiment of the invention, reconfiguring the at least one parameter of the accelerometer includes selecting a reduced sample rate for the accelerometer for the low power mode of operation.

In still another additional embodiment of the invention, reconfiguring the at least one parameter of the accelerometer includes selecting a reduced word size for the accelerometer for the low power mode of operation.

In yet still another additional embodiment of the invention, the telematics device, on receiving the interrupt from the accelerometer, is directed to provide a notification to an external server when a crash event is detected based on the analysis of the accelerometer data.

In yet another embodiment of the invention, reconfiguring the accelerometer for the low power mode of operation is based on a wake time needed for the processor to transition from the sleep mode of operation to the normal active mode of operation.

In still another embodiment of the invention, the processor of the telematics device, on reading the crash determination application, is further directed to: determine a power level of the vehicle battery, and reconfigure the accelerometer for a second low power mode of operation with a second reduced sample rate that provides a lower sample rate than the first low power mode of operation when the power level of the vehicle battery is below a threshold.

In yet still another embodiment of the invention, configuration settings for the low power mode of operation of the accelerometer are dynamically determined using machine learning to monitor characteristics of the operating environment in which the accelerometer is installed.

In yet another additional embodiment of the invention, configuration settings for the low power mode of operation of the accelerometer are pre-determined based on computing characteristics of the telematics device In yet another additional embodiment of the invention, configuration settings for the low power mode of operation of the accelerometer are determined based on characteristics of the vehicle in which the telematics device is installed.

In yet another embodiment of the invention, the telematics device, on receiving the interrupt from the accelerometer, is further directed to: analyze the accelerometer data stored in the FIFO buffer using a first stage analysis; and send the data to a remote server for further analysis if the first stage analysis is indicates a potential crash event.

DETAILED DESCRIPTION

Figure 1:
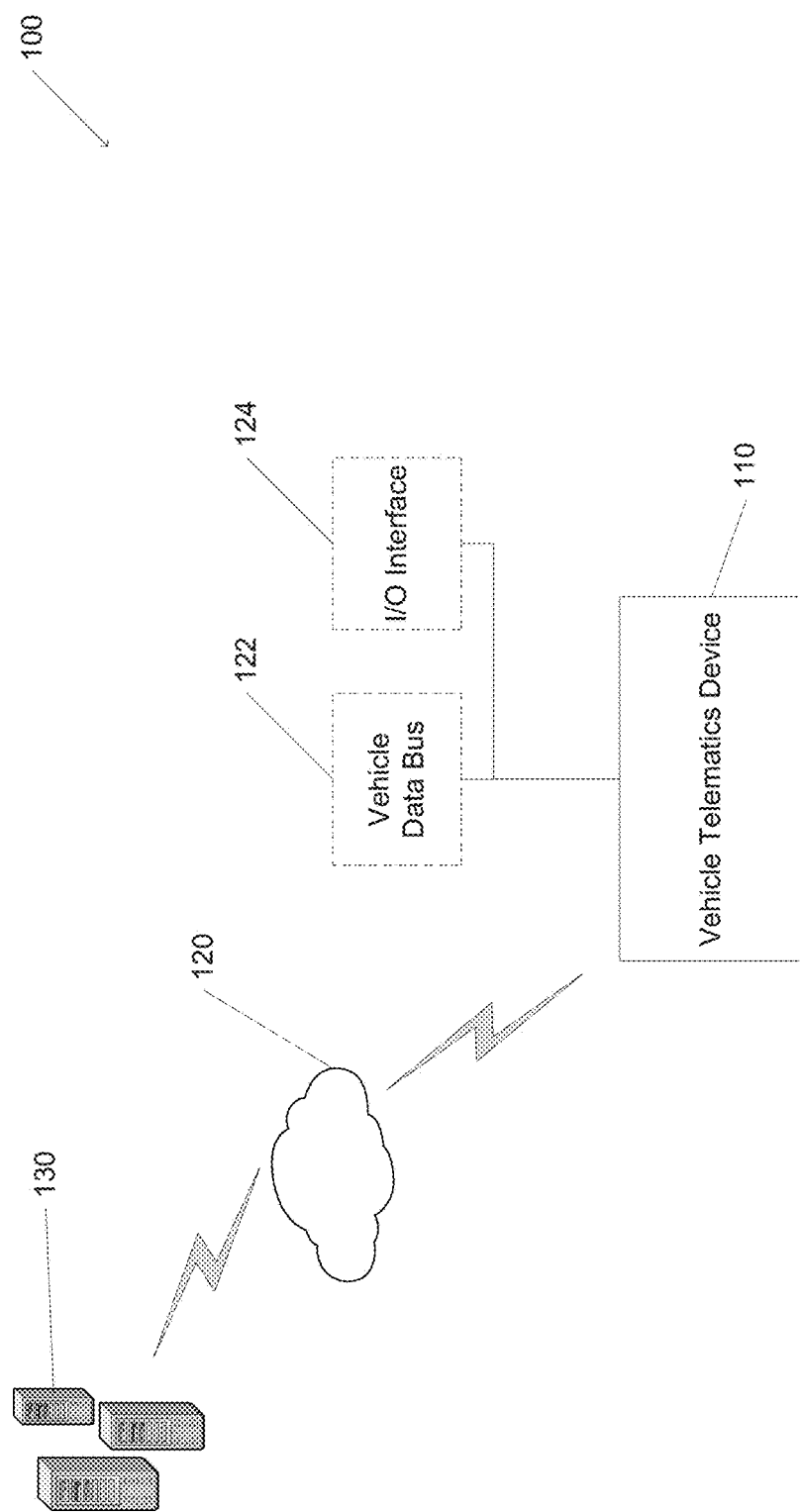
FIG. 1 is a conceptual illustration of a crash determination system in accordance with an embodiment of the invention.

Turning now to the drawings, systems and methods for detecting an impact to a parked vehicle (e.g., with an ignition off status) in accordance with embodiments of the invention are disclosed. Many vehicles may be equipped with telematics devices that include a variety of applications, including crash detection applications that execute while the vehicle is operational. The crash detection applications are capable of capturing data describing the operation of the vehicle before, during, and after a potential crash event. Many of the telematics systems may use data from a variety of sensors, including an accelerometer sensor to detect and monitor acceleration events to determine if an acceleration event worthy of reporting has occurred. The continuous sampling and, more significantly, processing of this data consumes more power than is acceptable for most vehicle environments while the vehicle is turned off. Accordingly, due to the amount of power required to run a crash detection application, these systems are generally turned off while the vehicle is parked to avoid draining the car battery. As such, existing telematics devices that include crash detection applications are unable to detect impacts while the vehicle is parked with the ignition off. Accordingly, many embodiments provide for a telematics device with a configurable low power accelerometer capable of detecting an impact to a parked vehicle with minimal power consumption requirements that avoids draining the battery of the vehicle and that is able to provide a notification to a user and or a server system that an impact has occurred.

Many embodiments provide a mechanism for detecting impacts while a vehicle is parked using a power management scheme that manages the collection and processing of accelerometer data. In many embodiments, the impact detection system uses a multi-stage acceleration detection scheme. In many embodiments, when the vehicle is parked (i.e., turned off) and before the processor and/or telematics units goes into a sleep mode of operation or is completely turned off, the processor configures a set of parameters of the accelerometer for a low power mode of operation in which the accelerometer, among various other configuration settings, is to monitor and collect acceleration data at a lower than normal sample rate than that which is used during the normal active operation status. In many embodiments, the particular sample rate selected is based on the computing characteristics of the telematics device such that the requisite acceleration data is retained during the time required for the telematics device to wake-up back from the sleep mode of operation to the normal active mode of operation. In particular, the sample rate selected for the computing environment ensures that the acceleration data is retained for a long enough time period within the accelerometer memory to accommodate the time required for the processor to wake up from the sleep mode in order to process the data.

Furthermore, in many embodiments, the accelerometer is configured to generate an interrupt that will wake up the processor and/or the telematics device if an acceleration event is detected that exceeds a preset threshold. Accordingly, while the processor and telematics device are asleep, the accelerometer can continue to operate in the low power mode to collect and store acceleration data in a continuous FIFO circular queue. Upon an acceleration event, the accelerometer may wake up the processor of the telematics device, which then reads the accelerometer data from the accelerometer's queue and makes a secondary determination of whether the acceleration event is worthy of further analysis and/or reporting. If so, the telematics device can process the data using a tertiary crash detection analysis and/or send the data to a server for further analysis, otherwise the telematics device can resume back to its sleep mode of operation and/or be turned off.

In many embodiments, while the telematics device is in the sleep mode while the vehicle is parked, various configuration settings, including the accelerometer's sample rate, word size, the depth of the accelerometer's data queue or FIFO buffer, the delay in the processor wakeup and the sample rate requirements of the acceleration detection process are all competing factors that may need to be balanced to provide the ability to detect an impact while the vehicle is parked. Accordingly, in many embodiments, the optimal set of accelerometer configuration parameters for each of the different modes of operation (e.g., low power mode, normal mode, among others) may be determined based on the computing environment in which the impact detection application is installed. In particular, in many embodiments, the low power mode configuration parameters for the accelerometer may be based on the amount of time required to wake up the processor of the telematics device, such that the data captured by the accelerometer at a particular time is still available in the accelerometer buffer by the time that the processor of the telematics device has awakened and is thus able to process the data.

For example, different computing environments may provide different wake times for a processor for transitioning from a sleep mode to a normal wake mode, from for example, a few seconds, while other computing environments and technology platforms, such as for example the Linux operating system platform, may require longer wake times such as e.g., 30 seconds to several minutes. Accordingly, with a too high a sample rate, the data in the accelerometer buffer may be lost by the time the processor is awake and ready to process the data. As such, many embodiments configure an accelerometer low power modes of operation in view of the wake time requirements of the computing environment in which the accelerometer is installed.

For example, a technological platform and computing environment that provides for a minimal wake time such as 2-3 seconds can allow the accelerometer to collect data a higher sample rate in view of the FIFO buffer size of the accelerometer while a longer wake (e.g., 30 seconds or more) time may require an accelerometer to collect data a lower sample rate, such that the FIFO buffer retains the acceleration data by the time the processor is awake and ready to process the data. Various other configuration parameters of the accelerometer can be optimized based on the computing environment in which the accelerometer is installed as appropriate to the requirements of specific applications in accordance with embodiments of the invention.

In many embodiments, the telematics device may dynamically configure the accelerometer for different modes of operation using machine learning to determine the characteristics of the computational environment and the optimal configuration parameters for the particular environment. For example, over time, the characteristics of the computing environment can change in part due to various factors including system upgrades, system degradation, memory usage, memory leaks, among various other factors. Accordingly, many embodiments of the telematics device can optimize and/or update the accelerometer configuration parameters for the low power mode to adapt to the changing real-time characteristics of the computing environment. For example, if a wake time for a processor is increasing over time, the telematics device can likewise reduce the sample rate, among various other parameters, of the accelerometer while in the low power mode to accommodate for the increased wake time.

In accordance with many embodiments of the invention, vehicle telematics devices are equipped with one or more sensors capable of determining the speed and/or acceleration of the vehicle. In particular, acceleration information for a vehicle can be measured using an accelerometer, which are often installed on a vehicle or mobile device. In many embodiments, the accelerometer can be configured for different modes of operation (e.g., normal mode, $1^{st}$ low power mode, $2^{nd}$ low power mode, among various other modes) whereby the power consumed by the accelerometer can be managed for different operational states of the vehicle. Many embodiments may use a MEMS 3-axis accelerometer that can be configured to continue to operate in a low power mode to conserve the battery power of vehicle while the vehicle telematics device is in a sleep mode of operation, which may occur when a vehicle is parked and the ignition is off. Accordingly, the accelerometer can be used to detect impact events to the parked vehicle without draining the vehicle battery and to wake the telematics device upon detecting an acceleration event indicative of an impact such that the data can be analyzed further.

In several embodiments, vehicle telematics systems are calibrated to accurately determine speed and/or acceleration data. Systems and methods for calibrating a 3-axis accelerometer which can be utilized to determine vibration information in accordance with a variety of embodiments of the invention are disclosed in U.S. Pat. No. 9,217,757, titled "Systems and Methods for 3-Axis Accelerometer Calibration" and issued Dec. 22, 2015, the entirety of which is hereby incorporated by reference.

Systems and methods for configuring an accelerometer in order to detect impacts in a parked vehicle accordance with embodiments of the invention are described in more detail below.

Impact Detection Systems

Impact detection systems in accordance with embodiments of the invention can monitor acceleration data from an accelerometer installed on a vehicle and detect when there has been an impact to the vehicle while it is parked with an ignition off status. A conceptual diagram of an impact detection system in accordance with an embodiment of the invention is shown in FIG. 1. The impact detection system 100 includes a vehicle telematics device 110 that can communicate with a remote server system 130, a vehicle data bus 122, and/or an input/output (I/O) interface 124 as appropriate to the requirements of specific applications of embodiments of the invention. In a variety of embodiments, the vehicle telematics device 110 communicates with the remote server system 130 via a network 120. In a variety of embodiments, the network 120 is the Internet. In many embodiments, the network 120 is any wired or wireless network, such as a cellular network, between the vehicle telematics device 110 and the remote server system 130. In a number of embodiments, the remote server system 130 implemented using a single server system. In several embodiments, the remote server system 130 is implemented using multiple server systems.

In a variety of embodiments, the vehicle telematics device 110 is installed in a vehicle having a vehicle data bus 122. In several embodiments, the vehicle telematics device 110 is installed in a vehicle diagnostic connector that provides access to the vehicle data bus 122. The vehicle telematics device 110 can obtain data from any of a variety of vehicle devices connected to the vehicle data bus 122 utilizing any of a variety of techniques as appropriate to the requirements of specific applications of embodiments of the invention. Vehicle devices can include, but are not limited to, engine sensors, electronic control unit (ECU) devices, alternator sensors, vibration sensors, voltage sensors, oxygen sensors, Global Positioning System (GPS) receivers, ignition devices, weight sensors, and/or acceleration determination devices. Systems and methods for connecting to a vehicle data bus that can be utilized in accordance with embodiments of the invention are described in SAE J1978, titled "OBD II Scan Tool," first published by SAE International of Troy, Mich. on Mar. 1, 1992 and last updated Apr. 30, 2002. Systems and methods for obtaining data from devices connected to a vehicle data bus are described in SAE J1979, titled "E/E Diagnostic Test Modes," first published by SAE International on Dec. 1, 1991 and last updated Aug. 11, 2014. The disclosures of SAE J1978 and SAE J1979 are hereby incorporated by reference in their entirety. In a number of embodiments, the vehicle telematics device is connected directly to one or more sensors within the vehicle and/or does not utilize the vehicle data bus 122.

The vehicle telematics device 110 can include any of a variety of sensors and/or devices, including those described above with respect to the vehicle data bus and those described in more detail below, to obtain data regarding the status of the vehicle, and to obtain accelerometer data that can be used to detect an impact to the vehicle while the vehicle is parked. This data can be utilized in a variety of crash determination processes to determine if there has been an impact to the parked vehicle and/or whether the vehicle has been involved in a crash as described in more detail below. The set of sensors including the accelerometer can communicate with the microcontroller via an interface bus, which can be an SPI (Serial Peripheral Interface) bus, an $I^2C$ interface, among various other interfaces as appropriate to the requirements of specific applications.

The vehicle telematics device 110 can also communicate with any of a variety of sensors and/or devices using the I/O interface 124. The I/O interface 124 can be any connection, including wired and wireless connections, as appropriate to the requirements of specific applications of embodiments of the invention. In several embodiments, the vehicle telematics device 110 is capable of executing scripts to read data and/or perform particular processes. These scripts can be pre-loaded on the device and/or obtained from the remote server system 130, vehicle data bus 122, and/or the I/O interface 124 as appropriate to the requirements of specific applications of embodiments of the invention. The vehicle telematics device 110 can be self-powered and/or connected into the electrical system of the vehicle in which the vehicle telematics device 110 is installed. In a variety of embodiments, the vehicle telematics device is powered via the vehicle data bus 122 and/or the I/O interface 124. In many embodiments, the vehicle telematics device 110 utilizes an accelerometer in order to detect impact events to the vehicle.

In a variety of embodiments, the vehicle telematics device 110 and/or remote server system 130 provides a user interface allowing for visualizing and interacting with the data. In several embodiments, the vehicle telematics device 110 and/or remote server system 130 provides an interface, such as an application programming interface (API) or web service that provides some or all of the data to third-party systems for further processing. Access to the interface can be open and/or secured using any of a variety of techniques, such as by using client authorization keys, as appropriate to the requirements of specific applications of the invention.

Although a specific architecture of an impact detection system in accordance with embodiments of the invention are discussed above and illustrated in FIG. 1, a variety of architectures, including sensors and other devices and techniques not specifically described above, can be utilized in accordance with embodiments of the invention. Furthermore, the processes described herein can be performed using any combination the vehicle telematics devices and/or the remote server systems as appropriate to the requirements of specific applications of embodiments of the invention.

Vehicle Telematics Devices

Figure 2A:
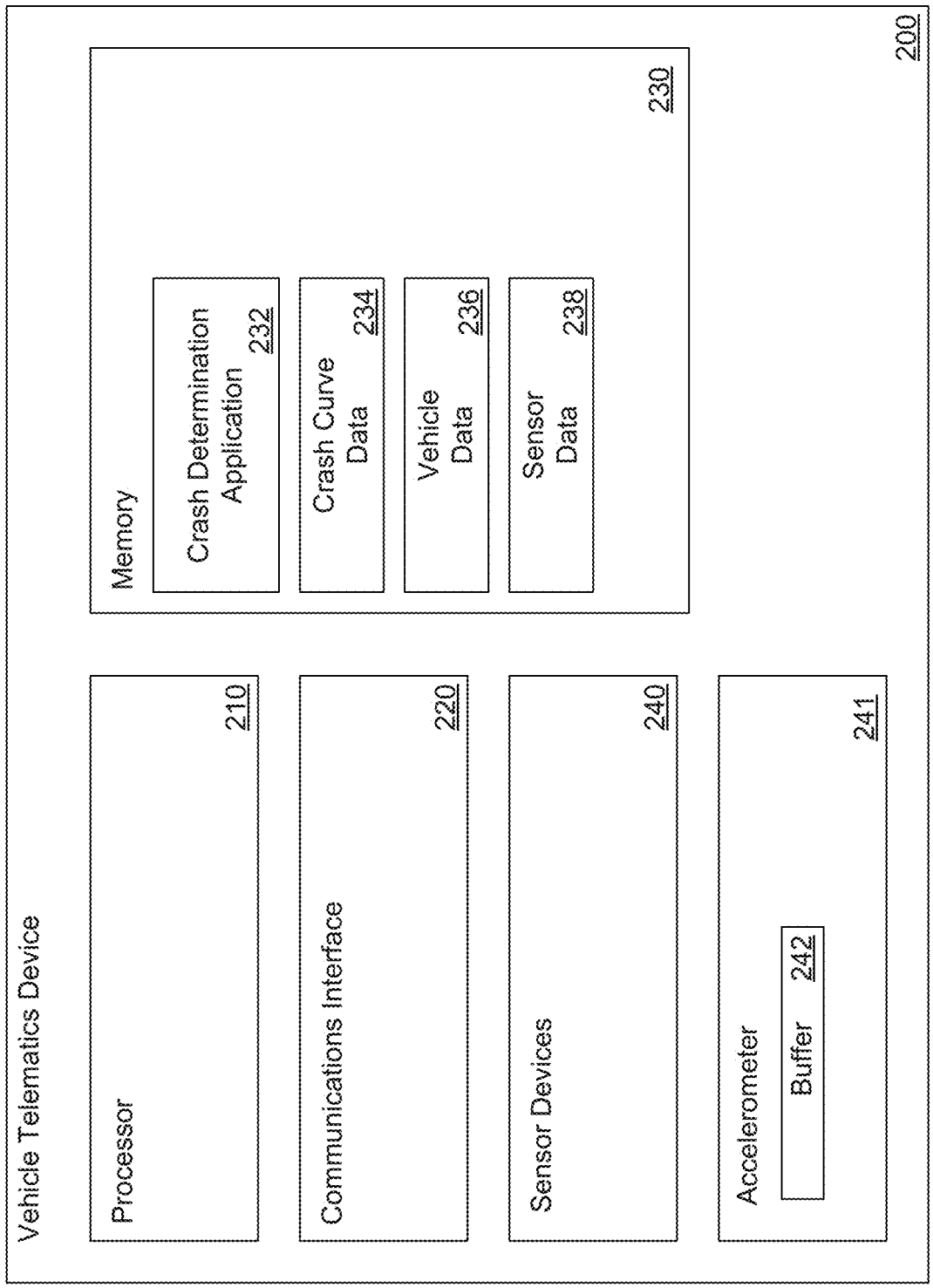
FIG. 2A is a conceptual illustration of a vehicle telematics device in accordance with an embodiment of the invention.

Vehicle telematics devices in accordance with embodiments of the invention can monitor accelerometer data obtained from an accelerometer in order to detect an impact to the vehicle while the vehicle is parked in order to determine if the vehicle has been involved in a crash. A conceptual illustration of a vehicle telematics device in accordance with an embodiment of the invention is shown in FIG. 2A. The vehicle telematics device 200 includes a processor 210 in communication with memory 230. The vehicle telematics device 200 can also include one or more communication interfaces 220 capable of sending and receiving data. In a number of embodiments, the communication interface 220 is in communication with the processor 210, the memory 230, the sensor device(s) 240, and/or an accelerometer 250. In several embodiments, the memory 230 is any form of storage configured to store a variety of data, including, but not limited to, a crash determination application 232, crash curve data 234, vehicle data 236, and sensor data 238. In many embodiments, the crash determination application 232, crash curve data 234, vehicle data 236, and/or sensor data 238 are stored using an external server system and received by the vehicle telematics device 200 using the communications interface 220. Sensor devices 240 can include RPM sensors, voltage sensors, GPS receivers, noise sensors, vibration sensors, acceleration sensors such as accelerometer 241, weight sensors, and any other device capable of measuring data regarding a vehicle as appropriate to the requirements of specific applications of embodiments of the invention. Sensor devices 240, including accelerometer 241, can be included within the vehicle telematics device 200 and/or located external to the vehicle telematics device 200. The vehicle telematics 200 can communicate with external sensor devices using the communications interface 220, such as via a vehicle data bus, I/O interface, and/or a network connection as appropriate to the requirements of specific applications of embodiments of the invention.

In many embodiments, the accelerometer 241 can be configured for different operating modes with different power consumption requirements, including an active measurement mode, in which the accelerometer 241 carries out measurements at full sampling rate, (e.g., 400 Hz) a first reduced mode, or low-power mode, where the internal sampling rate is reduced at the expense of a higher noise level; a second reduced mode, or auto-sleep mode, where it switches into sleep mode during periods where the vehicle battery level falls below a minimal threshold; and a third reduced mode, or standby mode, where no measurement are made. Accordingly, many embodiments of the telematics device may configure the accelerometer for a low power mode of operation while a vehicle is parked to avoid draining the car battery, yet providing the ability to detect impact events.

In many embodiments, the accelerometer may include a FIFO buffer 242 used to store data samples. In certain embodiments, the particular sample rate used for a particular mode of operation can be determined based on the wake-up time needed for the processor 210 to switch from a sleep mode to an active mode in order to retain a data sample in the buffer 242 for a long enough time period such that it is available to the processor 210 once the processor is awake and able to process the data. For example, upon the accelerometer detecting an acceleration event and generating an interrupt while the telematics device is in a sleep mode, the data sample stored in the FIFO buffer at the time of the interrupt event should be retained for a long enough time period for the processor to wake up and read to process the data. In order to retain the data sample, many embodiments may configure the accelerometer sample rate such that data samples are retained for long enough time periods within the FIFO buffer to accommodate the lag time needed for a processor 210 to awaken, and the reduced sample rate would capture new acceleration data samples without pushing out old samples out of the FIFO buffer before a processor is able to wake up and access the data.

Once the processor 210 is back to a normal mode of operation, the processor can further analyze the accelerometer data using the crash determination application 232 in order to determine whether the vehicle was involved in a crash. In many embodiments, the processor may use the crash determination processes in accordance with embodiments of the invention as described in U.S. Pat. No. 10,395,438, entitled "Systems and Methods for Crash Determination with Noise Filtering", by Jenkins et al., and U.S. Pat. No. 10,055,909 entitled "Systems and Methods for Crash Determination", by Jenkins et al., the entirety of which are herein incorporated by reference in their entirety. In particular, the telematics device may analyze the accelerometer data using a first stage analysis that includes calculating peak resultant data from acceleration data obtained using acceleration sensors and comparing the peak resultant data to a crash curve for the vehicle. As described above, a variety of sensors can be utilized to obtain the sensor data utilized to perform the crash determination processes. In many embodiments, the sensors include an accelerometer capable of measuring acceleration data along a forward (x) vector and a lateral (y) vector. If the first stage analysis determines that a crash may have occurred, the vehicle sensor data and data identifying the vehicle can be utilized to perform a further second stage analysis where vehicle sensor data can be obtained and utilized to calculate the resultant change in velocity for the vehicle. The vehicle sensor data can include acceleration data along one or more axes. The resultant change in velocity can be compared to the threshold data to determine if a crash has occurred. By way of example, if the resultant change in velocity is less than a threshold value then the event can be considered a non-crash and if the value is equal to or greater than a threshold value then it is considered a crash.

Figure 2B:
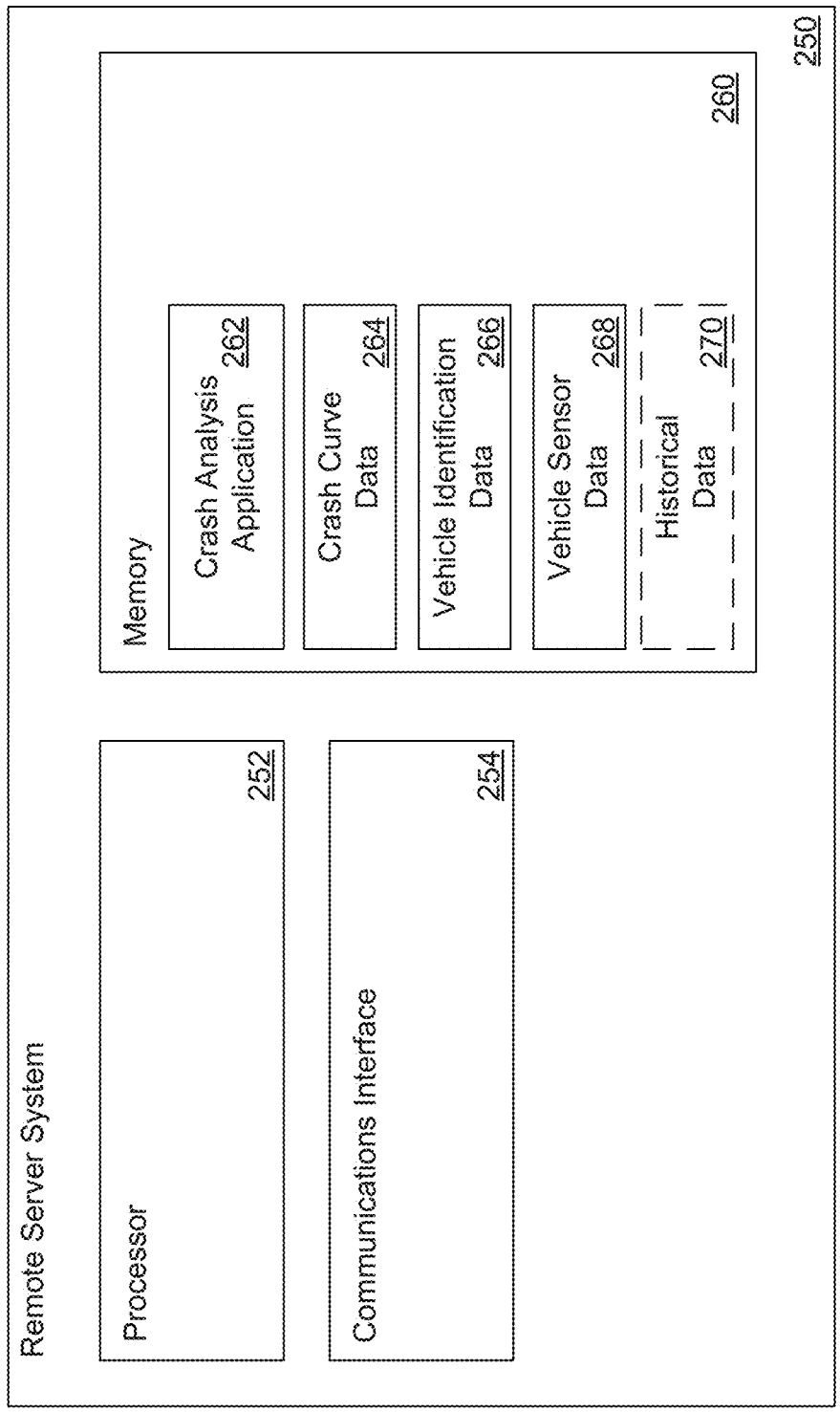
FIG. 2B is a conceptual illustration of a remote server system in accordance with an embodiment of the invention.

Remote server systems in accordance with embodiments of the invention can obtain data regarding the status of a vehicle and determine if the vehicle has been involved in a crash. A conceptual illustration of a remote server system in accordance with an embodiment of the invention is shown in FIG. 2B. The remote server system 250 includes a processor 252 in communication with memory 260. The remote server system 250 can also include one or more communication interfaces 254 capable of sending and receiving data. In a number of embodiments, the communication interface 254 is in communication with the processor 252 and/or the memory 260. In several embodiments, the memory 260 is any form of storage configured to store a variety of data, including, but not limited to, a crash analysis application 262, crash curve data 264, vehicle identification data 266, vehicle sensor data 268, and/or historical data 270. In many embodiments, the crash analysis application 262, crash curve data 264, vehicle identification data 266, vehicle sensor data 268, and/or historical data 270 are stored using an external server system and received by the remote server system 250 using the communications interface 254.

The processor 210 and processor 252 can be directed, by the vehicle telematics application 232 and the crash analysis application 262 respectively, to perform a variety of crash determination processes. Crash determination processes can include obtaining data from a variety of sensor devices, determining data regarding the state of the vehicle, and using the vehicle data and/or crash curve data to determine if the vehicle has been involved in a crash. As noted above, a number of crash determination processes that can be performed in accordance with embodiments of the invention are described in U.S. Pat. No. 10,395,438, entitled "Systems and Methods for Crash Determination with Noise Filtering", by Jenkins et al., and U.S. Pat. No. 10,055,909 entitled "Systems and Methods for Crash Determination", by Jenkins et al., the entirety of which are herein incorporated by reference in their entirety.

Although specific architectures for vehicle telematics devices and remote server systems in accordance with embodiments of the invention are conceptually illustrated in FIGS. 2A-B, any of a variety of architectures, including those that store data or applications on disk or some other form of storage and are loaded into memory at runtime, can also be utilized. Additionally, any of the data utilized in the system can be cached and transmitted once a network connection (such as a wireless network connection via the communications interface) becomes available. In a variety of embodiments, a memory includes circuitry such as, but not limited to, memory cells constructed using transistors, that are configured to store instructions. Similarly, a processor can include logic gates formed from transistors (or any other device) that dynamically perform actions based on the instructions stored in the memory. In several embodiments, the instructions are embodied in a configuration of logic gates within the processor to implement and/or perform actions described by the instructions. In this way, the systems and methods described herein can be performed utilizing both general-purpose computing hardware and by single-purpose devices.

Determining Accelerometer Configurations for Different Operation Modes

As described above, impact detection processes can include detecting an impact to a parked vehicle using accelerometer data. In several embodiments, the impact detection processes include determining an appropriate accelerometer configuration for a sleep mode of operation, including threshold values and accelerometer interrupts to be utilized in the impact detection process. Once an accelerometer configuration has been determined for the vehicle, the accelerometer data can be monitored for impact events which may trigger further analysis of the data by the processor.

In many embodiments, while the telematics device is in a sleep mode (or turned off inactive mode) of operation during time periods that a vehicle is turned off, an accelerometer may continue to monitor and collect accelerometer data while operating in a low power mode. The accelerometer may be configured to generate an interrupt that would then trigger a signal to wake the processor of the telematics device based on the accelerometer data exceeding a particular threshold value, which can be indicative of a potential impact to the vehicle.

In a number of embodiments, the accelerometer interrupt threshold value is pre-determined based on the operating environment in which the accelerometer will be installed. In certain embodiments, the accelerometer configuration parameters, including the interrupt threshold value can be determined dynamically based on a continued analysis of the operating environment. In a variety of embodiments, the threshold value may be based on the characteristics of the vehicle and/or the measured sensor data. The characteristics of the vehicle can be described using vehicle identification data including any of a vehicle identification number, the weight of the vehicle, the length of the vehicle, the width of the vehicle, the wheelbase of the vehicle, the height of the vehicle, weight map data describing the distribution of weight throughout the vehicle, location data, and any other data as appropriate to the requirements of specific applications of embodiments of the invention. The threshold value can be determined using a vehicle telematics device and/or obtained from a remote server system as appropriate to the requirements of specific embodiments of the invention.

In a variety of embodiments, the threshold value is based on the location in which the telematics unit and/or the sensor devices are installed in the vehicle. In many embodiments, the threshold value is based on the weight of the vehicle. In those embodiments where a threshold value has not been defined for a specific vehicle, the characteristics of the vehicle can be utilized to dynamically generate and/or select a threshold value that is appropriate to the specific vehicle. By way of example, the weight, height, length, and wheelbase of the vehicle can be utilized to determine a class of vehicle (i.e. small/medium/large and/or sedan/coupe/SUV/tractor/trailer) and a threshold value can be selected based on previously measured events for other vehicles having a similar weight, height, length, and wheelbase. In several embodiments, several threshold values can be combined to generate an appropriate threshold value for the specific vehicle.

Figure 3:
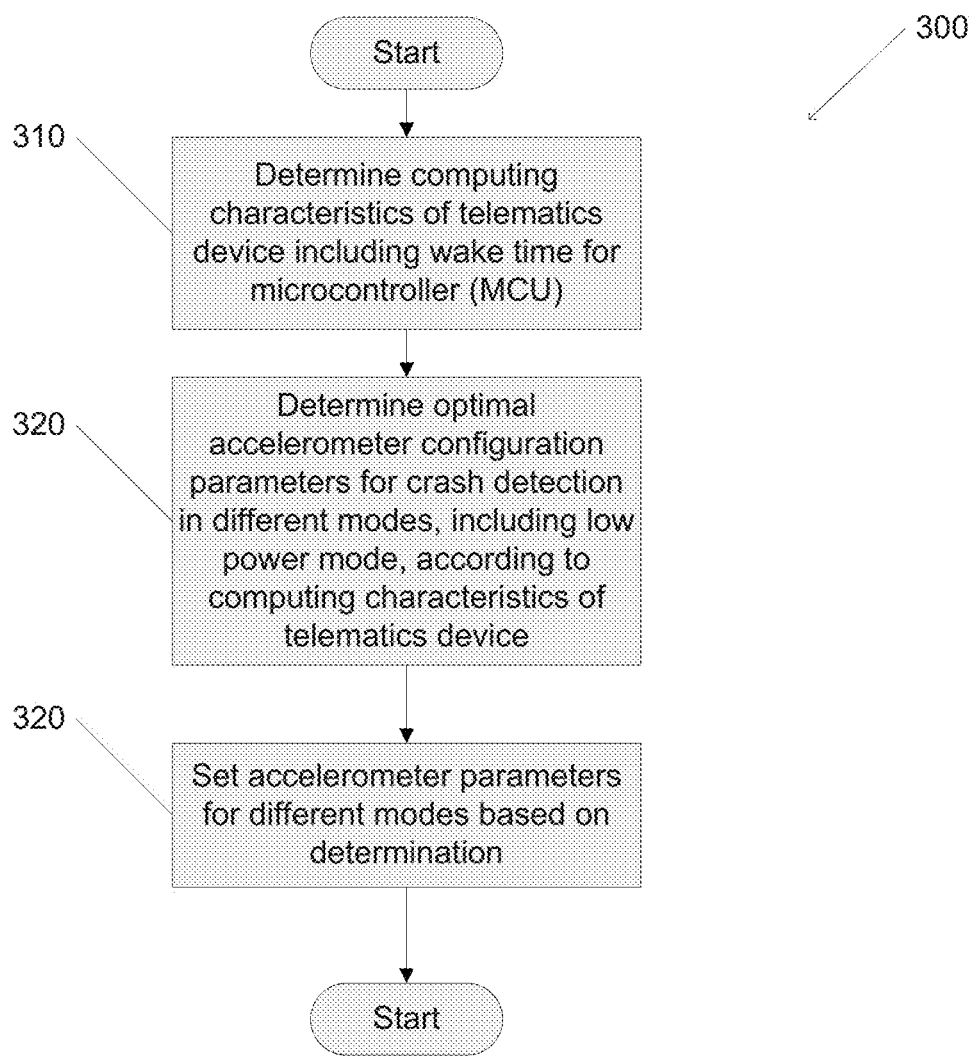
FIG. 3 is a flow chart illustrating a process for configuring an accelerometer for different modes of operation in accordance with an embodiment of the invention.

Turning now to FIG. 3, a process for configuring an accelerometer for different modes of operation, including a low power mode that allows for the detection of impacts to a parked vehicle in accordance with an embodiment of the invention is shown. The process 300 can include determining (310) computing characteristics of a telematics device, including a wake time for a processor (e.g., microcontroller) within the telematics device. The process determines (320) an optimal accelerometer configuration for impact detection for different modes of operation, including a low power mode and a normal activity mode based on the computing characteristics of the telematics device. In many embodiments, the process may determine the amount of time required to wake-up the processor of the telematics device from a sleep mode, and based on this, the process may select a sample rate, word size, among various other parameters for the low power mode accelerometer configuration based on the wake time. In many embodiments, the process may determine the configuration settings, as described in detail below, using: Duration (seconds)=Buffer Size (bytes)/[Sample Rate (samples/second)*Sample Size (bytes/axis)*3 (axis)].

In several embodiments, the process may configure a variety of other accelerometer configuration parameters, including the sample rate, word size, buffer size, resolution, among various other configuration settings, based on the computing characteristics of the telematics device. The process sets 320 the accelerometer configuration parameters for the different modes based on the determination. The process then completes.

Specific processes for determining accelerometer configuration parameters for detecting impacts in accordance with embodiments of the invention are described above and shown with respect to FIG. 3; however, any number of processes, including those that utilize different combinations of data than the examples described above, can be utilized as appropriate to the requirements of a specific application in accordance with embodiments of the invention. Techniques for impact detection and analysis in accordance with embodiments of the invention are described in more detail below.

Impact Detection While Vehicle Turned Off

A variety of impact detection processes include configuring an accelerometer to operate in a low power mode while a vehicle has been turned off in order to monitor for and detect impacts to the vehicle. In several embodiments, the telematics device, upon detecting that the vehicle has been turned off, reconfigures the accelerometer to place it in a low power mode that minimizes its power consumption such that it does not drain the vehicle battery and/or an external power source. The telematics device may then be put into a sleep mode, whereby the accelerometer may then continue to monitor for impact events to the vehicle while the vehicle is parked and the ignition turned off, and upon detecting an event, the accelerometer may generate an interrupt signal for the telematics device to wake up the processor such that it can analyze the accelerometer data to determine if further crash analysis is warranted.

Figure 4:
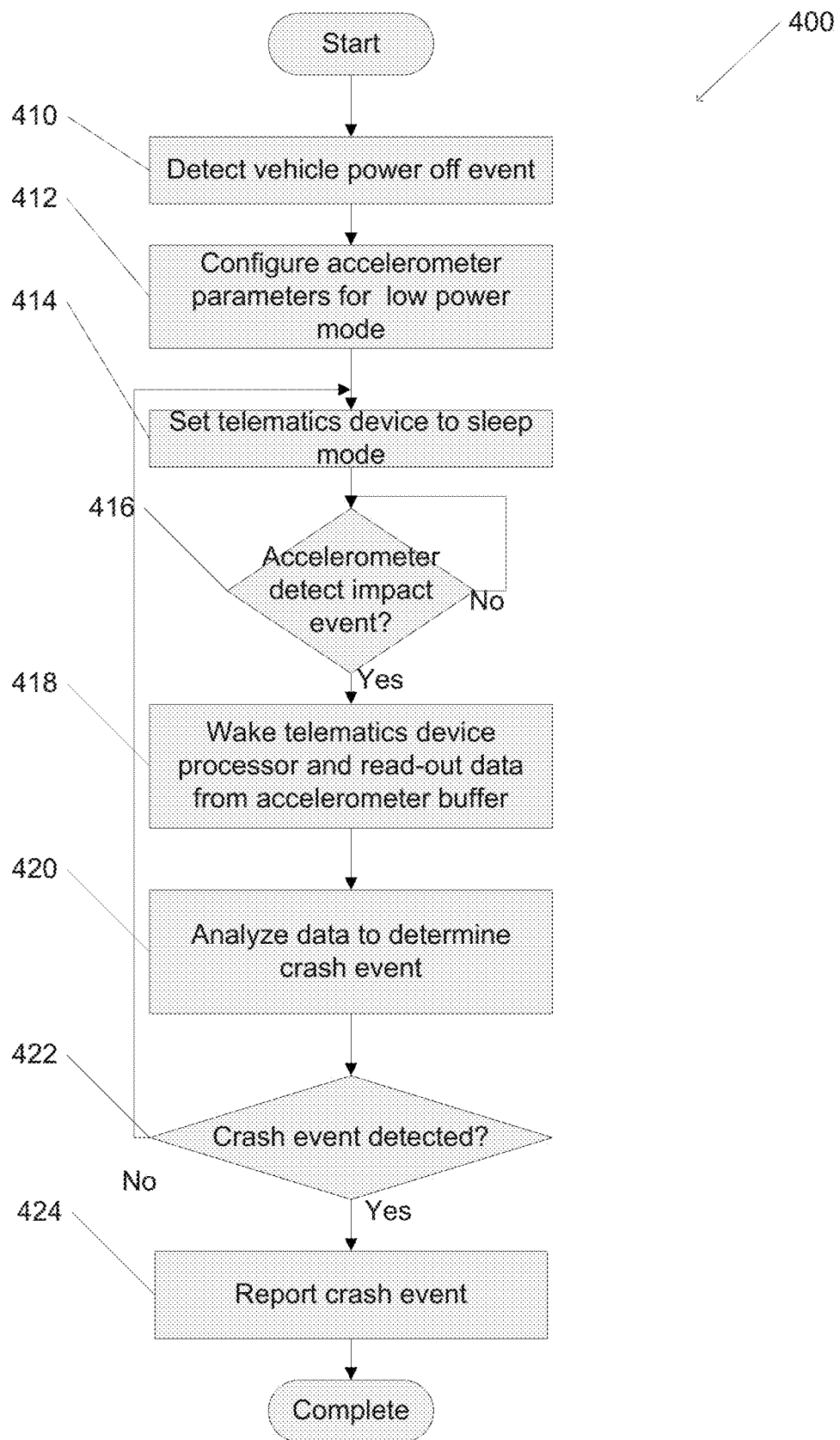
FIG. 4 is a flow chart illustrating a process for detecting an impact to a parked vehicle in accordance with an embodiment of the invention.

Turning now to FIG. 4, a process for detecting impact events to a parked vehicle in accordance with an embodiment of the invention is shown. The process 400 can include detecting (410) a vehicle power off event and configuring (412) the accelerometer parameters for a low power mode. The process sets (414) the telematics device to a sleep mode. The process determines (416) if the accelerometer detects an impact event, whereby the accelerometer generates an interrupt if it detects an impact greater than a threshold value and wakes (418) the telematics device processor from the sleep mode to read-out the accelerometer data from the accelerometer FIFO buffer. The process analyzes (420) the accelerometer data to determine if the data is indicative of a crash event. If a crash event is detected (422), the process reports (424) the event, otherwise, the process continues to monitor the accelerometer data generated by the accelerometer. The process then completes.

Specific processes for detecting impacts to a parked vehicle in accordance with embodiments of the invention are described above and shown with respect to FIG. 4; however, any number of processes, including those that utilize different accelerometer configurations than the examples described above, can be utilized as appropriate to the requirements of a specific application in accordance with embodiments of the invention. Techniques for determining accelerometer configurations for detecting impacts to a parked vehicle based on the power resources that are available in accordance with embodiments of the invention are described in more detail below.

Figure 5:
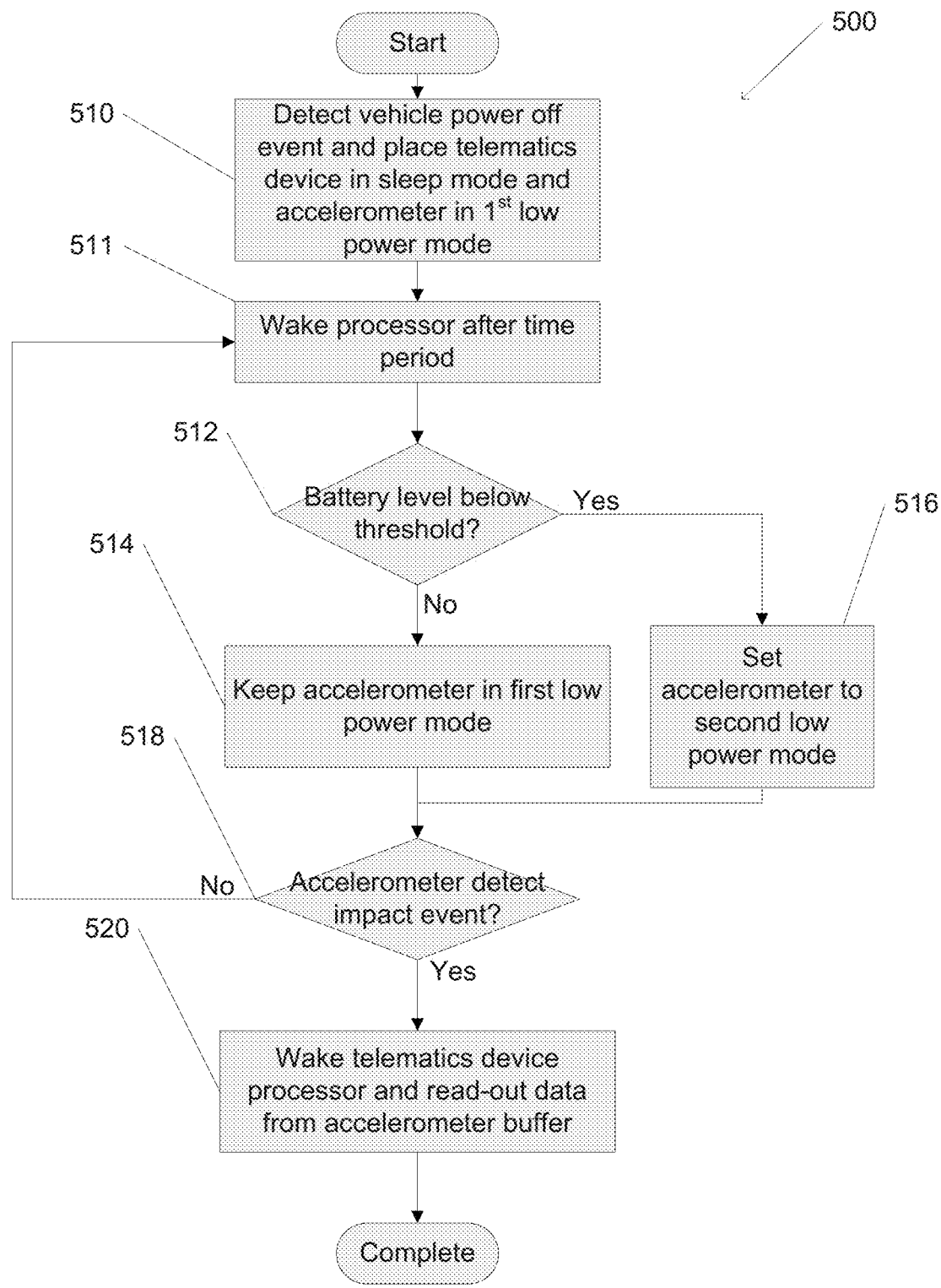
FIG. 5 is a flow chart illustrating a process for configuring an accelerometer based on different power thresholds for detecting an impact to a parked vehicle in accordance with an embodiment of the invention.

A process for determining an accelerometer configuration for detecting impacts to a parked vehicle based on the power resources available in accordance with an embodiment of the invention is illustrated in FIG. 5. The process 500 detects (510) a vehicle power off event and sets the telematics device to a sleep mode of operation and the accelerometer in a first low power mode of operation. The process wakes (511) the processor of the telematics device after a time period to check the vehicle battery status and determine (512) if a battery level is below a threshold, and if not, keeps (514) the accelerometer in the first low power mode of operation. In certain embodiments, the process may periodically wake the processor in order to check the battery level of the vehicle. For example, the processor may wake every few hours to check the battery level. For example, if the battery level of the car is sufficient, the first low power mode may provide a configuration setting that includes a particular higher sample rate and larger word size than if the battery level of the car is closer to being drained. If the battery level is below the threshold, the process sets (516) the accelerometer to a second low power mode of operation that provides a lower sample rate and/or reduced word size than the first low power mode. In certain embodiments, the process may completely turn off the impact detection feature when the vehicle battery is below a threshold to prevent draining the battery completely. In several embodiments, the first low power mode of operation may be kept at the normal mode of operation if the computing environment wake time from switching from the sleep mode to the normal mode is such that the data can be retained in the accelerometer buffer for the particular wake time. The process determines (518) if the accelerometer detects an impact event, and if so, the process wakes (518) the processor of the telematics device to read-out accelerometer data from the accelerometer FIFO buffer, otherwise, the process returns to 511 to periodically check the vehicle battery level. The process then completes.

Specific processes for detecting impacts to a parked vehicle using power management techniques in accordance with embodiments of the invention are described above and shown with respect to FIG. 5; however, any number of processes, including those that utilize different accelerometer configurations and/or modes than the examples described above, can be utilized as appropriate to the requirements of a specific application in accordance with embodiments of the invention.

Figure 6:
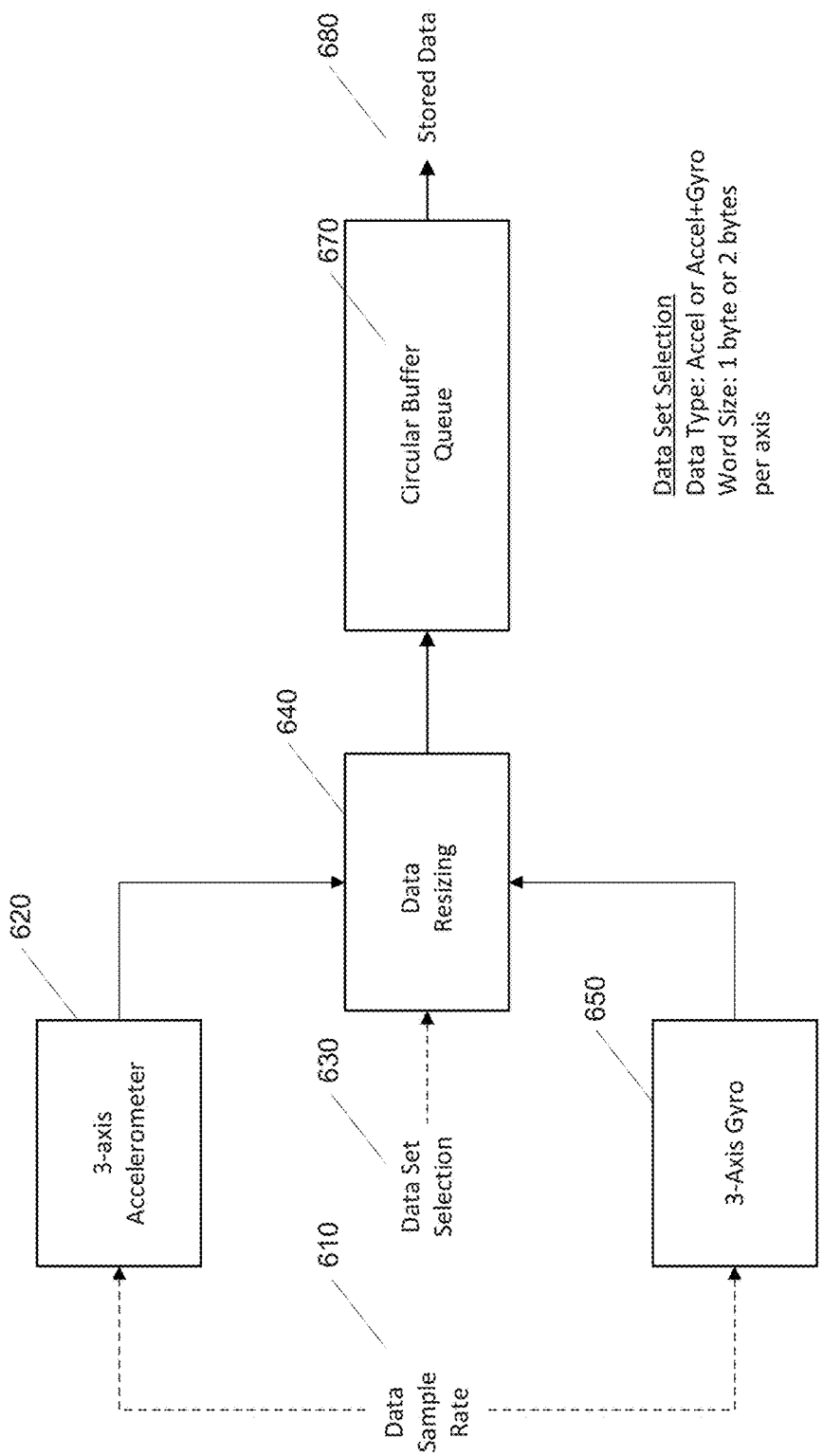
FIG. 6 illustrates an architecture and data flow for configuring an accelerometer and gyroscope in accordance with an embodiment of the invention.

As described above, the particular set of configuration settings for a particular mode of operation can vary based on a variety of characteristics of the operating environment of the telematics device, including the wake time needed to switch a processor from a sleep mode to a normal mode in order to enable the processor to begin processing data from the accelerometer. In many embodiments, the architecture for detecting impacts to a parked vehicle may include using data captured by an accelerometer and a gyroscope. Architectures for specifying the configuration parameters for a 3-axis accelerometer and a 3 axis gyroscope for detecting impacts to a parked vehicle in accordance with an embodiment of the invention is illustrated in FIG. 6. In many embodiments, the configuration settings for an accelerometer and gyroscope may be based on the amount of time needed to switch the processor of the telematics device from a sleep mode to a wake mode of operation. Based on this amount of time, different configuration settings, including sample rate and word size may be specified. In many embodiments, the following equation can be used to determine the various configuration settings:

$$\text{Duration} = \text{Buffer Size}/(\text{Sample Rate} * \text{Sample Size} * \text{Number of Axis})$$

where the duration is an amount of time (e.g., in seconds) required to switch a processor of a telematics device from a sleep mode (and/or power off mode) to a normal active mode, the buffer size is the size of the accelerometer buffer (e.g., in bytes), the sample rate can be, for example, a number of samples/second provided by the accelerometer, and the sample size can be the bytes/axis (e.g., 1 byte or 2 bytes per axis), and the number of axis is the number of accelerometer axis providing data (e.g., 3 for a 3-axis accelerometer).

As illustrated in FIG. 6, the data sample rate 610 can be set for the 3-axis accelerometer 610 and the 3-axis gyro 620 based on the equation above. The data set selection 630 can specify the word size (e.g., 1 byte of 2 byte) per axis, and the data from the 3-axis accelerometer 620 and the 3-axis gyro 650 can be read out to the data resizing 640 module which would then store the data in the circular buffer queue 670, and once the processor is awake, the data can be processed and stored 680. Accordingly, although FIG. 6 illustrates a particular architecture and data flow for specifying a variety of configuration settings for an accelerometer and gyroscope based on characteristics of the operating environment, any of a variety of architectures can be utilized, including architectures that utilize only an accelerometer (e.g., without using data from a gyroscope) to detect impacts as appropriate to the requirements of specific applications in accordance with embodiments of the invention.

Although the present invention has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present invention can be practiced otherwise than specifically described without departing from the scope and spirit of the present invention. Thus, embodiments of the present invention should be considered in all respects as illustrative and not restrictive. It will be evident to the person skilled in the art to freely combine several or all of the embodiments discussed here as deemed suitable for a specific application of the invention. Throughout this disclosure, terms like "advantageous", "exemplary" or "preferred" indicate elements or dimensions which are particularly suitable (but not essential) to the invention or an embodiment thereof, and may be modified wherever deemed suitable by the skilled person, except where expressly required. Accordingly, the scope of the invention should be determined not by the embodiments illustrated, but by the appended claims and their equivalents.

What is claimed is:

1. A vehicle telematics device, comprising:
 a processor and a memory storing a crash determination application; and
 an accelerometer that generates acceleration data at a normal sample rate during an active operation mode and stores the acceleration data in a first-in-first-out (FIFO) buffer;
 wherein the processor of the telematics device, on reading the crash determination application, is directed to:
  detect a vehicle ignition off event;
  reconfigure at least one parameter of the accelerometer for a low power mode of operation while in the vehicle ignition off state; and
  place the telematics device in a sleep mode of operation;
 wherein the accelerometer of the telematics device while operating in the low power mode of operation is directed to:
  detect, while in the vehicle ignition off event, an acceleration event indicative of the acceleration data exceeding a threshold value;
  generate, while in the vehicle ignition off event, an interrupt to wake the processor of the telematics device from the sleep mode of operation in response to detection of the acceleration event;
 wherein the telematics device, on receiving the interrupt from the accelerometer, is directed to:
  wake the processor in order to analyze accelerometer data stored in the FIFO buffer of the accelerometer.

2. The vehicle telematics device of claim 1, wherein the at least one parameter of the accelerometer is at least one parameter selected from the group consisting of a sample rate and a word size of the accelerometer.

3. The vehicle telematics device of claim 1, wherein reconfiguring the at least one parameter of the accelerometer comprises selecting a reduced sample rate for the accelerometer for the low power mode of operation.

4. The vehicle telematics device of claim 1, wherein reconfiguring the at least one parameter of the accelerometer comprises selecting a reduced word size for the accelerometer for the low power mode of operation.

5. The vehicle telematics device of claim 1, wherein the telematics device, on receiving the interrupt from the accelerometer, is directed to provide a notification to an external server when a crash event is detected based on the analysis of the accelerometer data.

6. The vehicle telematics device of claim 1, wherein reconfiguring the accelerometer for the low power mode of operation is based on a wake time needed for the processor to transition from the sleep mode of operation to the normal active mode of operation.

7. The vehicle telematics device of claim 1, wherein the processor of the telematics device, on reading the crash determination application, is further directed to:
 determine a power level of the vehicle battery; and
 reconfigure the accelerometer for a second low power mode of operation with a second reduced sample rate that provides a lower sample rate than the first low power mode of operation when the power level of the vehicle battery is below a threshold.

8. The vehicle telematics device of claim 1, wherein configuration settings for the low power mode of operation of the accelerometer are dynamically determined using machine learning to monitor characteristics of the operating environment in which the accelerometer is installed.

9. The vehicle telematics device of claim 1, wherein configuration settings for the low power mode of operation of the accelerometer are pre-determined based on computing characteristics of the telematics device.

10. The vehicle telematics device of claim 1, wherein configuration settings for the low power mode of operation of the accelerometer are determined based on characteristics of the vehicle in which the telematics device is installed.

11. The vehicle telematics device of claim 1, wherein the telematics device, on receiving the interrupt from the accelerometer, is further directed to:
 analyze the accelerometer data stored in the FIFO buffer using a first stage analysis; and
 send the data to a remote server for further analysis if the first stage analysis indicates a potential crash event.

12. A method for detecting impacts to a parked vehicle, comprising:
 detecting, using a processor of a telematics device, a vehicle ignition off event;
 reconfiguring at least one parameter of an accelerometer for a low power mode of operation while in the vehicle ignition off state;
 placing the telematics device in a sleep mode of operation;

detecting, using the accelerometer and while in the vehicle ignition off state, an acceleration event indicative of the acceleration data exceeding a threshold value;

generating, using the accelerometer, an interrupt to wake the processor of the telematics device from the sleep mode of operation in response to detection of the acceleration event;

analyzing, using the processor, accelerometer data stored in a FIFO buffer of the accelerometer.

13. The method of claim 12, wherein the at least one parameter of the accelerometer is at least one parameter selected from the group consisting of a sample rate and a word size of the accelerometer.

14. The method of claim 12, wherein reconfiguring the at least one parameter of the accelerometer comprises selecting a reduced a sample rate for the accelerometer for the low power mode of operation.

15. The method of claim 12, wherein reconfiguring the at least one parameter of the accelerometer comprises selecting a reduced word size for the accelerometer for the low power mode of operation.

16. The method of claim 12, further comprising providing a notification to an external server when a crash event is detected based on the analysis of the accelerometer data.

17. The method of claim 12, wherein reconfiguring the accelerometer for the low power mode of operation is based on a wake time needed for the processor to transition from the sleep mode of operation to the normal active mode of operation.

18. The method of claim 12, further comprising:

determining a power level of the vehicle battery; and reconfiguring the accelerometer for a second low power mode of operation with a second reduced sample rate that is lower than the sample rate of the lower power mode of operation when the power level of the vehicle battery is below a threshold.

19. The method of claim 12, wherein configuration settings for the low power mode of operation of the accelerometer are dynamically determined using machine learning to monitor characteristics of the operating environment in which the accelerometer is installed.

20. The method of claim 12, wherein configuration settings for the low power mode of operation of the accelerometer are pre-determined based on computing characteristics of the telematics device.

* * * * *